United States Patent [19]

Panush et al.

[11] Patent Number: 4,615,940

[45] **Date of Patent: * Oct. 7, 1986**

[54] PRIMER PRODUCED OPALESCENT COATING

[75] Inventors: Sol Panush, Farmington Hills; James M. Gelmini, Warren; Nancy B. Bradey, West Bloomfield, all of Mich.

[73] Assignee: Inmont Corporation, Clifton, N.J.

[ * ] Notice: The portion of the term of this patent subsequent to Jan. 14, 2002 has been disclaimed.

[21] Appl. No.: 736,027

[22] Filed: May 20, 1985

[51] Int. Cl.[4] .......................... B32B 5/16; B32B 19/00

[52] U.S. Cl. ................................. 428/324; 427/385.5; 427/388.1; 427/407.1; 427/407.2; 428/404; 428/426; 428/432; 428/457; 428/461; 428/690

[58] Field of Search ............... 428/324, 461, 404, 690, 428/432, 426, 457; 427/385.5, 407.1, 407.2, 388.1

[56] References Cited

U.S. PATENT DOCUMENTS 4,539,258 9/1985 Panush ................................ 428/324

*Primary Examiner*—Thomas J. Herbert

*Attorney, Agent, or Firm*—Harry J. Gwinnell; Emil Richard Skula

[57] ABSTRACT

A unique opalescent color effect is produced on a substrate material utilizing a multicoat coating system. The primer base coat is a nonmetallic primary color coat having an N-4 to N-8 value on the Munsell color chart. Directly on top of the primer base coat there is applied a transparent interference coat containing a polymeric binder and metal oxide encapsulated mica particles in a pigment to binder ratio of 0.06 to 0.13. On top of the previously applied coats is applied a transparent protective clear coat, the primary base color coat being a high solids content primer layer having good corrosion resistance, good adhesion, etc. The resultant coating in addition to being durable to the elements produces a unique opalescent color effect on the substrate material.

8 Claims, No Drawings

PRIMER PRODUCED OPALESCENT COATING

CROSS REFERENCE TO RELATED APPLICATIONS

Attention is directed to commonly assigned, application Ser. No. 691,099 filed Jan. 14, 1985 directed to opalescent coating systems now U.S. Pat. No. 4,539,258.

DESCRIPTION

1. Technical Field

The field of art to which this invention pertains is coating methods and the resultant coated articles.

2. Background Art

Multicoat coating systems are well known in the coating industry. U.S. Pat. No. 3,639,147 describes such a system for use as an automotive paint. And while such multicoat coating systems have been used for years in conventional color systems, recently they have been used to produce coating compositions with pearlescent features as well. Through the use of iron oxide coated mica pigments (Richelyn ® pigments, Inmont Corporation) pigments in the base color coat and the clear coat, new and unique colors have been produced which provide a soft, lustrous metallic appearance without the garishness of conventional aluminum containing enamels. Also, the additive color and transparency of these Richelyn pigments provide not only additive enriching color, but also a multiplicity of reflections and refractions. These reflections and refractions produce a myriad of soft, lustrous colors.

Accordingly, although multicoat coating systems have been used for many years, the art is constantly in search of novel or unique color effects which at the same time have the durability, high gloss, good color maintenance, etc. required of rigorous automotive paint applications.

DISCLOSURE OF INVENTION

A multilayer coating system is disclosed comprising at least three layers including a primer base coat, an interference coat, and a transparent topcoat. The primer base coat is a nonmetallic, primary color coat having an N-4 to N-8 value on the Munsell color chart. However, distinct from which has been done in the past (note commonly assigned application recited above) the primer base coat of the present invention is the primer coat, requiring no additional primer coats to produce such properties as good corrosion resistance, good adhesion, etc. Immediately next to this coat is a transparent interference coat comprising a polymeric binder containing metal oxide encapsulated mica particles in a particle to binder ratio of 0.06 to 0.13. Immediately on top of the transparent interference coat is a transparent protective clear coat. The three layers together so constituted produce a unique opalescent color effect on the substrate material. Providing the primer base coat color through the use of the primer coat results in such advantages as the reduction of application problems, such as dirt contamination, mottling, etc., improves the efficiency of the system, i.e., shortens spray lines, reduces spray stations, and improves durability, crazing, checking and moisture resistance.

Another aspect of the invention is a method of coating wherein the above primer base coat is applied, and after curing, the transparent interference coat is applied. While the transparent interference coat is still wet the transparent protective clear coat is applied. After all three coats are applied the multicoat coating system is heated sufficiently to cure the uncured polymers. By utilizing the compositions and processes so described, not only is a unique opalescent color effect produced, but one having high gloss, and durability to the elements as well. By utilizing a primer with good corrosion resistance, good adhesion, etc. additional coats over and above the primer layer are eliminated potentially producing improved color effects by eliminating additional layers as well as increased speed of coating, requiring less energy, and overall improved efficiency and economics.

The foregoing, and other features and advantages of the present invention will become more apparent from the following description.

BEST MODE FOR CARRYING OUT THE INVENTION

While any substrate material can be coated with the coating compositions according to the present invention, including such things as glass, ceramics, asbestos, wood, and even plastic material depending on the specific drying and/or curing requirements of the particular composition, the coating system of the present invention is particularly adapted for metal substrates, and specifically as an automotive paint finish system. The substrate may be bare substrate material or can be conventionally primed, for example, to impart corrosion resistance. Examples of metal substrates which can be coated according to the present invention include steel, aluminum, copper, magnesium, alloys thereof, etc. The components of the composition can be varied to suit the temperature tolerance of the substrate material. For example, the components can be so constituted for air drying (i.e. ambient), low temperature cure (e.g. 150° F.–180° F.), or high temperature cure (e.g. over 180° F.).

The primer base coat material, i.e. the pigmented polymer layer closest to the substrate, comprises any conventionally used primer coatings in this art having the properties of good corrosion resistance, adhesion, etc. including epoxies, acrylics, alkyds, polyurethanes, polyesters nitrocellulose and conventional anionic and cationic electrodepositable compositions such as amine solubilized epoxy resins.

Typical primer compositions are shown in Table I. All percents are by weight.

TABLE I

| Example No. | Composition | |
|---|---|---|
| 1 | 88.15% | epoxy ester (Epitex 1681-Celanese) |
| | 11.85% | butylated melamine (Synutex 403-Celanese) |
| | 100.00% | |
| 2 | 74.80% | polyester (Polyester Resin 5770.84-Cargill) |
| | 5.15% | epoxy (Epi-Rez 2136-Celanese) |
| | 2.14% | catalyst (Nacure X49-110-King Industries) |
| | 15.48% | melamine (Cymel 303-American Cyanamid) |
| | 2.03% | tertiary carboxylic acid (Cardura E-Shell) |
| | .40% | ultra violet absorber (Tinuvin 328-Ciba Geigy) |
| | 100.00% | |
| 3 | 65.00% | oil free polyester (Syntex 3723-Celanese) |
| | 35.00% | butylated melamine (Synutex 4113-E-Celanese) |
| | 100.00% | |
| 4 | 58.94% | oil free polyester (Oil Free |

TABLE I-continued

| Example No. | Composition |
| --- | --- |
| | Polyester-Celanese) |
| | 34.94% butylated melamine (Synutex 413-E-Celanese) |
| | 6.01% epoxy (Epi-Rez 510-Celanese) |
| | 0.10% ethyl hydroxyethyl cellulose (Low |
| | 100.00% Viscosity EHEC-Hercules) |

Pigmentation will vary depending on color but will typically comprise (% by weight):

| | | |
| --- | --- | --- |
| 70% to 92% | Barimite | (non-color imparting |
| 0% to 4% | Magnesium Silicate | corrosion inhibitors) |
| 30% to 4% | Color Portion | |

The acrylic resins useful in the interference or topcoat may be either thermoplastic (acrylic lacquer systems) or thermosetting. Acrylic lacquers such as are described in U.S. Pat. No. 2,860,110 are one type of film forming composition useful according to this invention in these coats. The acrylic lacquer compositions typically include homopolymers of methyl methacrylate and copolymers of methyl methacrylate which contain among others, acrylic acid, methacrylic acid, alkyl esters of acrylic acid, alkyl esters of methacrylic acid, vinyl acetate, acrylonitrile, styrene and the like.

When the relative viscosity of the acrylic lacquer polymer is less than about 1.05, the resulting films have poor solvent resistance, durability and mechanical properties. On the other hand, when the relative viscosity is increased above the 1.40 level, paints made from these resins are difficult to spray and have high coalescing temperatures.

Another type of film forming material useful in forming the interference or topcoat of this invention is a combination of a cross-linking agent and a carboxy-hydroxy acrylic copolymer. Monomers that can be copolymerized in the carboxy-hydroxy acrylic copolymer includes esters of acrylic and methacrylic acid with alkanols containing 1 to 12 carbon atoms, such as ethyl acrylate, methyl methacrylate, butyl acrylate, butyl methacrylate, 2-ethylhexyl acrylate, lauryl methacrylate, benzyl acrylate, cyclohexyl methacrylate, and the like. Additional monomers are acrylonitrile, methacrylonitrile, styrene, vinyl toluene, alpha-methyl styrene, vinyl acetate, and so forth. These monomers contain one polymerizable ethylenically unsaturated group and are devoid of hydroxyl and carboxylic groups.

The cross-linking agents used in combination with the hydroxy-carboxy copolymers are those compositions which are reactive with hydroxy and/or carboxylic acid groups. Examples of such cross-linking agents are polyisocyanates (typically di- and/or triisocyanates) polyepoxides and aminoplast resins. Particularly preferred cross-linking agents are the aminoplast resins.

The polyisocyanates when reacted with hydroxyl bearing polyester or polyether or acrylic polymers will yield urethane films useful in the process of this invention in both the primer base coat and topcoat. The isocyanate (—NCO)-hydroxyl (—OH) reaction takes place readily at room temperature, so that ambient and low temperature cure is possible.

Among other resins useful in the interference or topcoat are those commonly known as alkyd resins which are defined to include fatty acid or oil containing esterification products. The methods for preparing these resins are well known in the art.

The preferred alkyd resins useful in this invention are those containing from about 5 to about 65 weight percent of a fatty acid or oil and having an hydroxyl equivalent to carboxy equivalent ratio of from about 1.05 to 1.75. Alkyd resins having less than about 5% fatty compound are classified as the "oil-less" alkyd resins or polyester resins described hereinafter. On the other hand, alkyd resins containing greater than 65% of a fatty compound exhibit poor baking properties, poor chemical resistance and unsatisfactory adhesion to either the primer base coat or the substrate. When the hydroxyl to carboxyl equivalent ratio is less than about 1.05 gelation can result during polymer preparation while resins prepared having a ratio in excess of 1.75 have low molecular weights and therefore poor chemical resistance.

These alkyd resins can also be used as the primer base coat layer of this invention. It is preferred that the oil or fatty acid portion of the alkyd resin contain a light colored baking oil or fatty acid such as coconut or dehydrated castor oils or fatty acids. Furthermore, when these resins are used as topcoats they can be reacted with various acrylic or ethylenically unsaturated monomers as described above to produce vinyl modified alkyd resins.

Curing of these alkyd resins can be accomplished by blending with any of the previously described cross-linking agents in the same weight ratios as are used with carboxy-hydroxy copolymers.

Included among the various fatty acids and oils useful in preparing these alkyd resins are the fatty acids derived from the following oils: castor, dehydrated castor, coconut, corn, cottonseed, linseed, oticica, perilla, poppyseed, safflower, soybean, tung oil, etc., and the various rosins containing tall oil fatty acids. Useful polyols include the various glycols, such as ethylene glycol, propylene glycol, neopentyl glycol, butylene glycol, 1,4 butanediol, hexylene glycol, 1,6 hexanediol, the polyglycols such as diethylene glycol or triethylene glycol, etc.; the triols such as glycerine, trimethylol ethane, trimethylol propane, etc., and other higher functional alcohols such as pentaerythritol, sorbitol, manitol, and the like. Acids useful in preparing the alkyd resins of this invention include mono-functional acids such as rosin acids, benzoic acid, para tertiary butyl benzoic acid and the like; the polyfunctional acids such as adipic acid, azelaic acid, sebacic acid, phthalic acid or anhydride, isophthalic acid, terephthalic acid, dimerized and polymerized fatty acids, trimellitic acid, and the like.

Yet another useful interference or topcoat is prepared using nonaqueous dispersions such as are described in U.S. Pat. Nos. 3,050,412; 3,198,759; 3,232,903; and 3,255,135. Typically these dispersions are prepared by polymerizing a monomer such as methyl methacrylate in the presence of a solvent in which polymers derived from the above monomer are insoluble and a precursor which is soluble in the solvent. Nonaqueous dispersions can have a relative solution viscosity as previously defined of about 1.05 to 3.0. Dispersions having a relative solution viscosity in excess of about 3.0 are difficult to spray and have high coalescence temperatures while dispersions with a relative solution viscosity less than about 1.05 have poor chemical resistance, durability and mechanical properties. The monomers useful in preparing the above-dispersed copolymers or homopolymers are those listed previously as useful in forming the carboxy-hydroxy acrylic copolymers.

In another instance the interference or topcoat film can be produced from resins known as polyesters or "oil-less" alkyd resins. These resins are prepared by condensing nonfatty containing polyols and polyacids. Include among the useful polyacids are isophthalic acid, phthalic acid or anhydride, terephthalic acid, maleic acid or anhydride, fumaric acid, oxalic acid, sebacic acid, azelaic acid, adipic acid, etc. mono basic aids such as benzoic, para tertiary butyl benzoic and the like can also be utilized. Among the polyalcohols are the diols or glycols such as propylene glycol, ethylene glycol, butylene glycol, 1,4 butanediol, neopentyl glycol, hexalene glycol, 1,6-hexanediol, and the like; the triols such as trimethylol ethane, trimethylol propane and glycerine and various other higher functional alcohols such as pentaerythritol.

The primer-base coat is the primary color coat which not only provides the basic color, but is also the primer. This high solids nonmetallic (metal free) enamel is carefully designed for value (degree of darkness) and hue (undertone color). To produce the optimum in opalescence, the color value of the primer base coat must be at specific values (N-4 to N-8 preferably) on the Munsell color chart. Typically this value is N-5 to N-8 on the Munsell color chart and preferably N-7.

The color imparted to the primer base coat is critical insofar as coordination with subsequently applied coating materials to produce the opalescent color effect. The pigmentation must be nonmetallic and be added to the polymer binder in such amounts so as to produce an N-4 to N-8 value on the Munsell color chart. Outside of this range, the opalescent effects desired are virtually unperceptible. The hue of this primer base coat can vary across the (color) spectrum as long as the N-4 to N-8 value is retained and has been adjusted for a color value away from the gray to achieve a desired color sensation. The spectrum in this N-4 to N-8 value range can be produced using any conventional pigmentation known to produce such a color effect. Typically, the coloration is provided to the primer base coat utilizing such things as various combinations of titanium dioxide, blue tone phthalocyanine green, yellow tone phthalocyanine green, green tone phthalocyanine blue, and lamp black. In such combinations the titanium dioxide represents the largest portion of the coloration (99% by weight based on dry pigment) with the yellows, blues, greens representing about 0.3% to about 0.5% by weight and the lamp black representing about 0.7% to about 0.5% by weight. The primer base coat is typically applied (air or rotational atomization) in about 0.4 mil to about 1.4 mils in thickness with 0.5 mil to 1.0 mil preferred and 0.7 mil to 0.9 mil optimum. The amount of pigment in the primer base coat generally comprises about 15% to about 50% by weight, preferably about 25% to about 45% and typically about 38% by weight (measured as pounds of pigment per hundred pounds of primer base coat enamel with a pigment to binder ratio preferably greater than 1:1).

The Munsell scale of value exhibits ten visually equal steps ranging between black (N-0) and white (N-10), the intermediate chips being dark to light grays. The Munsell value of a color is the same as that of the gray sample in the same row of the constant hue charts. Thus, a red having the designation 5R 7/3 where the "7" indicates the value which is equal to the gray N-7.

Opalescence is achieved by diffraction grating over the neutral gray where the interference of light is reflected and the complementary color is transmitted, allowing the hues to shift and shimmer, vanish and reappear depending on the angle of the light source and the angle of the viewer. With the brain thus confused, the interpretation is that of a composite mellow glow of undulating hues most pleasant and pleasing as anchored by neutral gray.

All colors, including black and white, fatigue the eye and produce softer images. In observing any particular point in a scene, all contrasts which are directly in front of the eyes are reduced; high values are reduced and low values are raised. Everything is drawn towards middle gray. This neutralized middle gray is the solvent of all other colors and values and mingles with them when they pass away from the center of vision or when they become wearied. Neutral gray is the anchor of all passing colors. Neutral gray picks up the complementary color of any hue next to it, i.e., red next to gray looks green, yellow next to gray looks violet, orange next to gray looks blue.

Since complementary colors when mixed together neutralize each other to gray but the result is a vibrating effect full of delicate, shifting, elusive hues, faint echoes of original hues, e.g., red gray alternating with green gray, yellow gray alternating with violet gray, orange gray alternating with blue gray.

Thus, by making an N-7 value and shifting the hues from red to green, yellow to violet or orange to blue, a base color is produced through which optimum opalescence can be obtained in a myriad of colors. Under the same premise the value of the primer base coat can be either increased or decreased using the neutral hue or shifting the hues and reduce the opalescent effect while retaining a mellow glow of undulating hues. For example, a Primary N-7 value can be obtained in the primer base coat with a pigment composition comprising in the color portion by weight:

| | |
|---|---|
| 99.0 | Titanium Dioxide |
| 1.0 | Lampblack |
| 100.0% | Dry Pigment |

The primary value can be shifted with the following color portion compositions:

| | Lighter | Darker |
|---|---|---|
| Titanium Dioxide | 99.7 | 94.0 |
| Lampblack | 0.3 | 6.0 |
| Dry Pigment | 100.0% | 100.0% |

Within these values the hues can be shifted as desired while maintaining the desired value. See the Table below (parts by weight). As mentioned above, any deviation in value from N-7, either lighter or darker, can reduce opalescence. However, the shimmer and soft glow of color will be retained although less confusing to the brain and definite colors will be manifested.

TABLE II

| | Neutral | Blue Green | Green Blue | Yellow Green | Yellow Red | Blue Red | Red Blue |
|---|---|---|---|---|---|---|---|
| Titanium Dioxide | 99.0 | 99.0 | 99.0 | 99.0 | 99.0 | 99.0 | 99.0 |
| Lampblack | 1.0 | 0.3–0.5 | 0.3–0.5 | 0.3–0.5 | 0.3–0.5 | 0.3–0.5 | 0.3–0.5 |
| Blue Tone | | | | | | | |
| Phthalocyanine Green | | 0.7–0.5 | | | | | |
| Green Tone | | | | | | | |
| Phthalocyanine Blue | | | 0.7–0.5 | | | | |
| Yellow Tone | | | | | | | |
| Phthalocyanine Green | | | | 0.3–0.5 | | | |
| Monastral Red Y | | | | | 0.7–0.5 | | |
| Quinacridone Magenta | | | | | | 0.7–0.5 | |
| Indanthrene Blue | | | | | | | 0.7–0.5 |

Any of the above cited non-primer polymers may be used as the binder in the transparent interference coat as long as they are relatively clear. The only pigmentation in this coat is produced by mica flakes bearing a layer of metal oxide such as iron oxide or titanium dioxide. The pigment to binder weight ratios (P/B) in this coating is carefully controlled to represent about 0.06 to about 0.13.

The mica particles are carefully screened and controlled particles all within about 5 microns to about 60 microns (preferably about 5 microns to about 45 microns, and typically about 5 microns to about 35 microns) in their largest dimension and about 0.25 micron to about one micron in thickness. The closely controlled particle size provides the transparent, translucent, reflective and refractive features necessary for this layer.

This interference coat is a transparent, light scattering layer which reflects and refracts each lightwave as it enters the layer, allowing penetration of the lightwaves to the primer-base coat where they will be reflected back through the interference layer and again reflected and refracted before exiting the layer. The bending and redirection of the lightwaves as they pass through or bounce off the coated mica produces the myraid iridescence of color (like a soap bubble effect) that "floats" from hue to hue without any discernible break in the color (hue) transformation.

This interference (or sandwich) coat is a low pigment to binder transparent enamel containing the interference colorant at specific colorant levels, typically as indicated below:

| | |
|---|---|
| Solid Vehicle (binder) | 38.35 to 39.36 |
| Coated Mica | 5.00 to 2.50 |
| T.N.V. (total nonvolatiles) | 43.35% to 41.86% |
| P/B | .13 to .06 |

Interference colors are achieved by a specific buildup of titanium dioxide on a mica substrate varying only by a few microns to yield a color range from yellow, red, copper, lilac, blue, and green.

The addition of another metal oxide layer (e.g., Fe, Cr, etc.) in minute quantity to the top of the titanium dioxide layer yields additional dimensions of color play, since another layer of reflection, refraction, and transmission is involved.

The interference colors show one color on reflection and the complementary color on transmission. If the reflected color is red, the transmission color will be green and weaker in intensity. The transmission color can be seen if viewed at different angles. Both the angle of illumination and observation affect the color variations.

The interference or sandwich coat must be a semi-transparent, light scattering enamel, allowing the penetration of lightwaves to the primer base coat where they can be reflected. The level of interference in this enamel must be carefully controlled between 2.5% to 7.5% interference pigments in the enamel. Levels below 2.5% are so weak tinctorially that they do not contribute any effect. Conversely, should the level of the interference colorant exceed 7.5%, then the effective chromaticity of the interference coat dominates the color and opalescence is lost. For example:

(a) 0% to 2.0% interference color—maximum transparency, minimal interference, minimal opalescence;
(b) 2.5% to 5.0% interference color—semi-transparency, optimum interference, optimum opalescence;
(c) 7.5% and up interference color—maximum opacity and chroma, maximum interference, minimal opalescence.

The interference coat is preferably formed by blending the selected interference color into this clear at 2.5 to 5.0 (weight percent) and applying this coat wet-on-wet over the primer base coat to a dry film build of about 0.7 mil to 1.3 mils. Optimum dry film is 0.9 mil to 1.0 mil. This package (primer base coat and interference coat) will produce the optimum in opalescence, using the contrasting and/or complementary color process between primer base coat and interference coat.

The final layer is also constituted of the same non-primer polymers as above recited with the caveat of being totally transparent. This layer should contain ultraviolet light stabilizers or absorbers (e.g. hindered amines) to absorb and screen out ultraviolet radiation. This transparent clear coat should be applied at about 1.8 mils to 2.3 mils dry film thickness. Optimum dry film is about 1.9 mils to 2.1 mils thick. The clear coat should be applied wet-on-wet over the interference coat.

Utilizing the compositions of the present invention offers a means of combining the desirable properties of a combination of resin systems. For example, in automotive finishes the pigment control properties of acrylic lacquers can be combined with the chemical resistance properties of thermosetting acrylic resins by applying a thermosetting acrylic clear coat over a pigmented thermoplastic acrylic lacquer base or interference coat (although acrylic lacquers may be used for all layers). Likewise, in appliance finishes the chemical resistance of polyester resins can be combined with the lower cost of thermosetting acrylic resins by applying a polyester clear topcoat over a pigmented thermosetting acrylic base or interference coat. Although any of the above-mentioned thermoplastic materials may be used to form the transparent topcoat, better durability is achieved if the topcoat is one of the above-cited thermosetting materials, i.e. the material containing the cross-linking agents.

In all instances where the above methods and compositions are used extremely high gloss films result. In fact, using the process of this invention gloss readings in excess of 100 are readily obtained.

The metal oxide encapsulated mica pigments according to the present invention are primarily $TiO_2$ encapsulated mica pigments commercially available from the Mearl Corporation and EM Chemicals.

For additional exterior durability (e.g. exposure to the sun) minor amounts of other additives (e.g. additional layers) such as high temperature stable metal oxides such as antimony, copper, calcium, cadmium, chromium, cobalt, barium, strontium, manganese, magnesium, nickel and lithium and the like can also be used on the encapsulated mica. The oxide encapsulation layer is generally in the molecular range of thicknesses representing about 10% to about 85% by weight of the total weight of the encapsulated mica particle, preferably about 20% to about 60%, and typically about 29% to about 48% by weight.

The uniformity of shape (platelet) and smoothness of the metal oxide encapsulated mica pigment according to the present invention (e.g. as compared to the highly fragile, three dimensional and complicated configuration of aluminum flake, a standard in the automotive paint industry) eliminates the problem of color drift due to the shear forces (yielding fragmentation problems) in the handling (overhead pumping facilities) and application problems of ghosting, mottling, silkiness and repair color matching.

The primer base coat, interference coat and the topcoat can be applied by any conventional methods in this art such as brushing, spraying, dipping, flow coating, etc. Typically spray application is used, especially for automotive finishing. Various types of spraying can be utilized such as compressed air spraying, electrostatic spraying, hot spraying techniques, airless spraying techniques etc. These can also be done by hand or by machine. If the primer base coat is a cationic epoxy resin as is conventional in this art it may be applied out of a bath having a voltage of 350 volts to 400 volts for about 2 minutes producing a film build of about 0.6 mil to about 0.7 mil. The conductivity of the coating bath should be about 900 micro ohms to about 1100 micro ohms. After the coating is applied it is typically baked at 350° F. for about 20 minutes. As stated above this is a conventional primer application in this art.

The primer base coat is typically applied from about b 0.4 mil to about 1.4 mils and preferably about 0.5 mil to about 1.0 mil. This thickness can be applied in a single coating pass or a plurality of passes, and very brief drying ("flash") between applications of coats can be employed. After application the primer coat is typically cured for 20 minutes to 30 minutes at about 250° F. to about 350° F.

Once the primer base coat has been applied and cured the transparent interference coats and topcoats are applied after a brief flash at ambient temperature for about 30 seconds to about 10 minutes, preferably about one minute to about three minutes. While the respective coats can be dried for longer periods of time, even at higher temperatures, a much improved product is produced by application of the successive coats after only a brief flash ("wet-on-wet"). Some drying out of the preceding coat is necessary to prevent total mixing of the respective coats. However, a minimal degree of interaction is desirable for improved bonding of the coatings. The topcoat is applied thicker than the preceding coats (preferably about 1.8 mils to 2.3 mils) and can also be applied in a single or multiple pass.

The term transparent film is defined as film through which the primer base coat and interference coat can be seen. As stated above it is preferred that the transparent film contain a UV absorbing compound and/or hindered amine UV stabilizer and be substantially colorless so that the full polychromatic and aesthetic effect of the primer base coat-interference coat is not substantially decreased. The outstanding feature of the topcoat is the significant improvement in the durability which is provided to the overall coating. The total dry film thickness for this enamel system is typically about 3.1 mils to 4.9 mils and preferably about 3.7 mils. Sufficient wetting takes place at the interface of the respective coatings so that no problem with delamination or solvent release from either coating is incured.

Once the successive coats are applied the entire system is again flashed for about 30 seconds to about 10 minutes and the total coatings are then baked at a temperature sufficient to drive off all of the solvent in the case of thermoplastic layers and a temperature sufficient to cure and cross-link in the case of the thermosetting layers. These temperature can range anywhere from ambient temperature to about 400° F. Typically in the case of thermosetting material temperatures of about 225° F. to about 280° F. (for example 250° F.) are used (e.g. for about 30 minutes).

The following examples are illustrative of the principles and practices of this invention although not limited thereto. Parts and percentages where used are parts and percentages by weight.

EXAMPLE

Bonderized steel panels are sprayed with a typical primer base composition having a pigment composition as follows (percents by weight):

| | | |
|---|---|---|
| 70.05 | PE1204 | Barimite |
| 22.55 | PW0169 | R902 ($TiO_2$) |
| 0.75 | PN0240 | B-2093-F Metallic Brown |
| 0.50 | PK0302 | Regal SRF-S Pellets (Black) |
| 4.40 | PY9152 | #176 Strontium Yellow |
| 1.75 | DS0757 | Bentone 34 (anti-settling agent) |
| 100.00 | | |

This particular composition could have an N-3 to N-4 value on the Munsell color chart. Increasing the $TiO_2$ portion would place it in the N-4 to N-8 range desired.

The primer base coat is baked for 20 to 30 minutes at 275° F. to 350° F. This produces corrosion resistance, adhesion, etc.

With the below pigment compositions in the color portion of the pigment, mixed with the non-color imparting corrosion inhibiting pigments as set forth above the primer coat will have a color value of N-7 on the Munsell color chart. The color portion is prepared in three separate samples as follows:

| | | | |
|---|---|---|---|
| Titanium Dioxide | 99.0 | 99.0 | 99.0 |
| Blue Tone Phthalocyanine Green | 0.3-0.5 | | |
| Yellow Tone Phthalocyanine | | | |

-continued

| | | | |
|---|---|---|---|
| Green | | 0.3–0.5 | |
| Green Tone Phthalocyanine | | | 0.3–0.5 |
| Lampblack | 0.7–0.5 | 0.7–0.5 | 0.7–0.5 |

Polyester resin (Cargill 5770-85) is blended with the above anti-corrosion and color pigments. The pigment is blended with the primer base coat polymer composition in an amount of 37.5% by weight of the composition. The coating is applied by spraying to a thickness of 0.7 mil to 0.8 mil. After curing the interference coat was applied to the individual samples. The polymer binder was prepared by blending 144 parts of a copolymer formed by reacting 47 parts of butylmethacrylate, 37 parts of styrene, 15.75 parts of hyroxypropyl methacrylate and 0.25 part of methacrylic acid with 176 parts of xylene and butanol (and a weight ratio of 85/15). A pigment to binder ratio of 0.06 to 0.13 is used for the samples:

| | | | |
|---|---|---|---|
| 2.5 | to | 5.00 | $TiO_2$ Coated Mica |
| 39.36 | to | 38.35 | Dry Vehicle |
| 41.86 | to | 43.35% | T.N.V. (total nonvolatiles) |

The interference coat is applied at a thickness of 0.9 mil to 1.0 mil. After a flash of approximately two minutes at room temperature the transparent protective clear film is applied utilizing 144 parts of the copolymer solution described above at 45% T.N.V. with 58 parts of 60% T.N.V. of butylated methylol melamine. The coating is applied at a thickness of $2.0\pm0.1$ mils. After a two minute flash the total system is baked for 30 minutes at 250° F.

The three samples have three different color effects basically categorized as green on the blue side, green on the yellow side and blue on the green side. In addition , a clean, rich, soft opalescense is produced which is both durable and has high gloss and other aesthetic characteristics including color travel, depth and clarity. Opalescent colors are produced according to the present invention by developing an interference coat that unites with a neutral gray (N-7 on Munsell color chart) primer base coat developing colors that are a blend of the complementary color from each color chart.

Where additive colors (the blending of various colorants at specific ratios to produce the desired value, chroma, and hue) are a product of all the colorants, opalescent colors are a by-product of two coatings that produces a color unlike either of the individual coatings.

Where additive colors retain color symmetry through all viewing angles with variations in value or undertone, opalescent colors will shift in hue and chroma with minor changes in the viewing angle.

Where additive colors rely totally on synergism to obtain color and durability, opalescent colors rely on both synergism and antagonism to develop the color and durability.

Opalescent colors are a kaleidoscope of constantly changing hues and values. Where a kaleidoscope depends on the repositioning of colored glass fragments, opalescence develops with changes in the viewing angles. The end result and the means to that result are identical: reposition the colorant in a kaleidoscope, the color is moved; in opalescence reposition the viewer, the color is moved.

Opalescence is the unique shifting from color to color and hue to hue without a break in the flow. Color flows into color; hue flows into hue.

The compositions and processes according to the present invention provide many improvements over the paint compositions and processes of the prior art. Unique color effects are produced without the need for metal particles and the application and stability problems associated with them. Novel color effects can be produced. Better hiding of surface defects can be produced. Color not available with other pigment systems are produced while maintaining an appealing and desirable soft, lustrous appearance. Weather durable color effects are produced.

The applied compositions are not moisture sensitive, are less sensitive to criticality of applications, can withstand the elements (i.e. sun exposure), do not operate with subtractive color effects when mixed with other pigments, allow low bake repair color matching, and resist settling and chemical (e.g. acid rain) attack.

In addition to the energy savings, efficiency, labor savings, etc. the economics of the opalescent coating system is improved by elimination of the most expensive coating from the system. The base coat, for example as described in applicant's copending application above represents the most expensive component of the prior system. Additional problems related to this base coat may be eliminated or reduced are such things as strike-in, mottling, entrapped solvents, pigment float, etc.

It should be noted that while the compositions of the present invention are particularly adapted for original equipment manufacture coatings for automobiles, one of their advantages is the low bake matching use as refinish compositions as well. Whereas in original equipment manufacture the disclosed cellulose esters and/or wax are typically used, such are not universally required, for example, in refinish compositions. Also, where the thermosetting polymer embodiments are preferred in the original equipment manufacture, in refinish either low temperature cure thermosetting materials (e.g. 150° to 180° F.) or ambient temperature cure thermosetting or thermoplastic materials are preferred.

In the typical opalescent coating, a primer layer is deposited followed by a colored base coat, an interference coat, and a clear coat. With the present invention the colored primer-base coat is applied followed by the interference coat and the clear cost. This eliminates an entire application reducing the total film build by 1.0 mil to 1.5 mils. This provides additional advantages such as the application of all the coatings by the same method, e.g. electrostatically; application of all coatings with existing equipment and spray line configurations; high gloss, mottle free finish; excellent holdout, i.e., no telegraphing of base coat imperfections; high durability, weather and moisture resistance; clean, dirt free finishes; and excellent color matching, especially with tack ons, high bake and low bake repair and job-to-job matching.

Opalescent coatings for the automotive enamels are a totally new and unique color system. Whereas all prior art in this field was based on the concept of additive color, this new art is based on reflection, refraction, complementary and contradictory color transmission.

Although this invention has been shown and described with respect to detailed embodiments thereof, it will be understood by those skilled in the art that various changes in form and detail thereof may be made without departing from the spirit and scope of the claimed invention.

We claim:

1. A substrate material coated with at least three layers of a decorative, protective coating comprising a non-metallic primer coat having an N-4 to N-8 value on the Munsell color chart, said primer coat applied onto the substrate material, a transparent interference coat comprising a polymeric binder containing metal oxide encapsulated mica in a pigment to binder ratio of 0.06 to 0.13 on the primer coat, and a transparent protective polymeric clear coat on the transparent interference coat, the coating producing an opalescent color effect on the substrate material.

2. The coated substrate of claim 1 wherein the primer coat has an N-5 to N-8 value on the Munsell color chart.

3. The coated substrate of claim 1 wherein the substrate is metal and the metal oxide is titanium dioxide.

4. A method of coating a substrate with a plurality of layers of polymer comprising applying at least one layer of a non-metallic primer coat having an N-4 to N-8 value on the Munsell color chart directly onto the substrate, applying a transparent interference coat comprising a polymeric binder containing metal oxide encapsulated mica in a pigment to binder ratio of 0.06 to 0.13 on the primer coat, and applying a transparent polymeric protective clear coat on the transparent interference coat, heating the applied coatings thus producing an opalescent color effect on the substrate material.

5. The method of claim 4 wherein the substrate is metal and the metal oxide is titanium dioxide.

6. The method of claim 4 wherein the primer coat has an N-5 to N-8 value on the Munsell color chart.

7. The method of claim 6 wherein the primer coat has an N-7 value on the Munsell color chart.

8. The method of claim 7 wherein the substrate is metal and the metal oxide is titanium dioxide.

* * * * *